United States Patent [19]

Lien

[11] Patent Number: 4,780,211

[45] Date of Patent: Oct. 25, 1988

[54] METHOD OF DEWATERING USING PTFE MEMBRANE

[75] Inventor: Larry A. Lien, Solana Beach, Calif.

[73] Assignee: Desalination Systems, Inc., Escondido, Calif.

[21] Appl. No.: 928,312

[22] Filed: Nov. 7, 1986

[51] Int. Cl.$^4$ .............................................. B01D 13/00
[52] U.S. Cl. .................................. 210/644; 210/654; 210/708; 210/799; 210/DIG. 5
[58] Field of Search .............. 210/643, 644, 651, 654, 210/708, 799, DIG. 5, 500.36, 653

[56] References Cited

U.S. PATENT DOCUMENTS

| | | | |
|---|---|---|---|
| 3,342,729 | 9/1967 | Strand | 210/651 X |
| 3,367,504 | 2/1968 | Westmoreland | 210/321 |
| 3,542,203 | 11/1970 | Hancock et al. | 210/321 |
| 3,554,378 | 1/1971 | Kohl | 210/321 |
| 3,616,929 | 11/1971 | Manjikian | 210/321 |
| 3,682,318 | 8/1972 | Rigopulos | 210/321 |
| 3,715,036 | 2/1973 | Hamer | 210/321 |
| 3,737,043 | 6/1973 | Clark | 210/321 |
| 3,872,014 | 3/1975 | Schell | 210/232 |
| 3,880,739 | 4/1975 | Leavitt | 195/28 R |
| 3,953,566 | 4/1976 | Gore | 264/288 |
| 4,187,390 | 2/1980 | Gore | 174/102 R |
| 4,201,664 | 5/1980 | Hekal | 210/23 H |
| 4,332,686 | 6/1982 | Gerlach et al. | 210/651 |
| 4,439,322 | 3/1984 | Sonoda et al. | 210/500.2 |
| 4,525,374 | 6/1985 | Vaillancourt | 210/500.36 X |

OTHER PUBLICATIONS

Zahka, J. et al., "Ultrafiltration of Latex Emulsions", Chem. Eng. Proc., Dec. 1977, pp. 53–55.
Reprint of ICI Engineering Plastics, No. 4, 1975, entitled "Gore-Tex* Expanded PTFE; A Porous and Versatile Structure of Fluon ® PTFE".

*Primary Examiner*—Frank Sever
*Attorney, Agent, or Firm*—Fitch, Even, Tabin & Flannery

[57] ABSTRACT

Membranes of highly crystalline PTFE having an average pore size between about 0.01 micron and about 0.5 micron ordinarily reject any passage of water while allowing an organic nonpolar liquid to flow therethrough. By thoroughly wetting an expanded polytetrafluroethylene membrane with isopropyl alcohol, such a membrane will selectively allow the passage of a polar liquid, for example water, therethrough while rejecting other components, including nonpolar organic liquids, such as oil, kerosene or the like, and dissolved components of fairly large molecular size. Such IPA-wetted membranes are used to separate oil-water mixtures by allowing the water to selectively permeate through the membrane. The membrane may include a 5 mil thick backing layer of nonwoven synthetic fibers. The mixture is supplied to the membrane at a pressure not greater than about 90 psig., and often very low pressures of about 5–20 psig. can be used.

3 Claims, No Drawings

METHOD OF DEWATERING USING PTFE MEMBRANE

The invention is generally directed to the separation of a polar liquid from a mixture containing it and another component, which may be a nonpolar organic liquid, and to semipermeable membranes specially adapted to perform such methods.

Reverse osmosis membranes for the separation of solvents from solutions, such as the separation of water from aqueous solutions of organic salts, have been known for some two decades. Since this time, a variety of semipermeable membranes have been developed for both reverse osmosis and ultrafiltration processes which membranes have proved useful in separating liquids from mixtures of liquids as well as liquids from solutions of salts and the like. Somewhat more recently, there has been interest in using semipermeable membranes to treat oil-in-water emulsions, and attempts have been made to develop semipermeable membranes which can be advantageously used for such purposes. U.S. Pat. No. 4,201,664 to I. M. Hekal mentions without giving specifics, that semipermeable membranes of a fairly wide variety of materials may be useful for this purpose. In U.S. Pat. No. 4,439,322, it is stated that a particular polymethylmethacrylate membrane can be utilized to separate water from an oil-in-water emulsion.

U.S. Pat. No. 3,880,739 is interested in carrying out an enzymatic reaction with a long chain paraffin, e.g., n-tetradecane, using a water-soluble enzyme. The patent states that the reaction could be carried out on a continuous basis by utilizing a water-in-oil emulsion and separating the oil through a polysulfone semipermeable membrane which would allow the oil phase to pass while retaining the enzyme encapsulated within drops of water on the reactor side thereof, a working example being provided in Example 6. U.S. Pat. No. 4,332,686 states that a linear polyurethane membrane is alleged to separate a two percent oil-in-water emulsion by retaining the oil and allowing the water to pass through the membrane. Porous sheets of expanded polytetrafluoroethylene (PTEE) membranes are marketed by W. L. Gore and Associates under the tradename Gore-Tex as being useful for a number of filtering operations including the separation of oil from water by allowing oil to pass through the membrane while retaining the water.

Although the aforementioned materials have answered some needs in these areas, improved materials and methods of separation are constantly being sought.

SUMMARY OF THE INVENTION

Membranes of highly crystalline PTFE having an average pore size between about 0.01 micron and about 0.5 micron reject any passage of water while allowing an organic nonpolar liquid to flow therethrough. It has now been found that, by thoroughly wetting an expanded polytetrafluoroethylene membrane with isopropyl alcohol, such as a membrane will selectively allow the passage of a polar liquid, for example water, therethrough while rejecting other components, including nonpolar organic liquids, such as oil, kerosene or the like, and dissolved components of fairly large molecular size, as well as suspended solids. Accordingly, such IPA-wetted membranes are useful to separate, for example, an oil-water mixture by causing water to selectively permeate through the membrane.

DETAILED DESCRIPTION OF THE PREFERRED EMBODIMENTS

If such a highly crystalline PTFE membrane of relatively uniform pore size between about 0.01 micron and about 1 micron is thoroughly wet with isopropyl alcohol, the surface of the PTFE membrane retains isopropyl alcohol(IPA) substantially uniformly tchereacross, and the characteristics of the membrane from the standpoint of permeation are surprisingly changed. The IPA-wet PTFE membrane when operated at an appropriate differential pressure, i.e., the difference between the pressure at the upstream or inlet surface of the membrane and the pressure at the downstream or outlet surface of the membrane, will allow substanially only water to pass through the pores and will reject any nonpolar organic liquid component of a mixture applied thereto, as well as suspended solids of small particle size and dissolved solids of fairly large molecular size, e.g. milk proteins such as casein. The temperature at which the separation method is operated does not appear to be limiting, and temperatures between about 0° C. and about 100° C. are contemplated, with the method usually being performed at ambient temperatures unless it is convenient or otherwise advantageous to use a higher temperature. A pressure is chosen to provide the desired flow rate; pressures below about 90 psig are used.

Membranes of expanded PTFE having a highly crystalline polymer structure and pore sizes within the desired range can be produced by the process set forth in U.S. Pat. No. 3,953,566 to R. W. Gore, disclosure of which is incorporated herein by reference. The thickness of such film membranes can range between about 0.5 mil (1 mil=0.001 inch) and about 5 mils. For handling purposes, such films are preferably disposed upon a porous layer of woven or nonwoven material, such as is known in this art. Examples of such backing layers include polyester, polypropylene, nylon and other similar synthetic fiber nonwoven felts, as well as finely woven products, e.g. porous nylon sailcloth or even window screening. The thickness of the backing layer will usually be at least about 5 mils to about 10 mils for a nonwoven material. Woven materials are also available in this general size range. As mentioned above, the PTFE membrane does not require support; however, the backing facilitates handling. Such backing sheet materials are well known and are commercially available in sheet form.

The PTFE membrane should have an average pore size between about 0.1 micron and about 1 micron, and preferably between about 0.02 micron and about 0.5 micron. The thickness of the membrane can be between about 0.5 mil and about 4 mils and preferably is between about 2 and about 3 mils.

The membrane is preferably used in a spirally wound form, such as that conventionally employed in various reverse osmosis (RO) and ultrafiltration (UF) modules for carrying out liquid separation processes. Examples of apparatus using such spirally wound semipermeable membrane modules are disclosed in U.S. Pat. Nos. 3,554,378, 3,542,203 and 3,872,014; however, other membrane configurations, such as those shown in U.S. Pat. Nos. 3,616,929, 3,682,318, 3,715,036 and 3,737,043, may also be employed.

The composite membrane of PTFE laminated atop the backing membrane is suitably wetted with isopropyl alcohol. Preferably, it is simply submerged in a bath of 100 volume percent isopropyl alcohol for a suitable length of time, e.g., between about 2 minutes and 10 minutes, so that substantially the entire surface of the PTFE membrane becomes wetted and retains IPA. Preferably the membrane is contacted with IPA for at least about 5 minutes to achieve the desired result. It should be understood that less than pure IPA, for example an 80 volume percent mixture of IPA with 20 volume percent water, can also be used, in which instance, contact between the mixture and the membrane is maintained for a longer period of time, for example at least about 20 minutes. Simiarly, even longer periods of submergence might be used with even more dilute aqueous IPA solutions; however, the wetting solution should contain at least about 50 volume percent IPA. Once the membrane has been treated so that its surface is wetted with IPA, it is handled so that evaporation is avoided, lest the desirable characteristics imparted to the membrane by the IPA-wetting be lessened or even entirely lost. Treatment in this manner is believed to cause IPA to be adsorbed onto the surface and therefore change its character in the regions of its pores.

These IPA-wetted PTFE membranes can be employed to separate a polar liquid, such as water, from a wide variety of liquid mixtures, such as those including at least one nonpolar organic liquid and at least one polar liquid. The nonpolar liquid may be soluble to substantially any percent in the polar liquid, e.g., completely soluble, moderately soluble, sparingly soluble or insoluble, and vice versa. For example, the nonpolar liquid may be a hydrocarbon having a viscosity between about 0.5 centipoise and about 1000 centipoises, such as diesel fuel kerosene and gasoline. Water is the most common polar liquid which is employed, inasmuch as common treatment of water, particularly for environmental purposes and to lessen contamination, makes it the major polar liquid of interest. However, other polar liquids might also be so treated. In addition oily aqueous mixtures having substantial amounts of suspended fine particulate matter can be "dewatered", and solutions containing fairly large dissolved materials, e.g. casein can be concentrated by removing water. These membranes have particular advantages because they can be operated at pressures lower than UF membranes and resist fouling which can be a major problem for UF membranes when oils are present in the mixture. Such low pressure permit the use of fairly inexpensive low pressure piping and pumps.

In addition to providing a good separation between polar and nonpolar liquids, it is important that the membrane have a reasonable permeate flux therethrough. In order to have some standard in which to express permeate flux, the industry has generally agreed upon a statement of measurement in terms of an "A" value. An A-value of 1 means there is a permeate flux of 1 gallon of liquid for each square foot of membrane surface per day at 70 psig on the inlet side and atmospheric pressure on the outlet side. For example, a membrane which has an A-value of 95 when operated at an inlet pressure of 30 psig would mean that the membrane had a flux of about 40 gallons per square foot per day at that pressure.

The following examples illustrate the best modes presently known by the inventor for carrying out the subject matter of the invention. However, these examples are provided for purposes of illustration and are not meant to be limiting upon the scope of the invention which is set forth in the claims appended thereto.

EXAMPLE I

For purposes of testing membrane performance, standard test modules are constructed where the membrane in sheet form is coiled spirally about a central tubular core, as generally illustrated in U.S. Pat. No. 3,367,507 to Westmoreland. This standard membrane module includes about 7.1 square feet of PTFE composite membrane wrapped about a central tubular mandrel about 0.5 inch in diameter, with interconnections between the interior of the tubular mandrel and the outlet surface or backing layer region of the membrane providing means for withdrawing the permeate. The outer diameter of the wrapped tubular module is about 2.5 inches, and its axial length is about 12 inches. The PTFE membrane is sold under the trademark Gore-Tex by W. L. Gore and Associates, and the membrane used has substantially uniform pores of about 0.2 micron. The PTFE membrane has a thickness of about 2.5 mils and is laminated on top of a backing layer of nonwoven polypropylene having a thickness of about 10 mils which is so porous to be in no way limiting. The module is submerged in 100 percent isopropyl alcohol and is left in submerged condition for about 5 minutes, at the end of which time the PTFE membrane surface has been totally in contact with isopropyl alcohol. The isopropyl alcohol is allowed to drain for about 10 minutes from the membrane following its removal, and prior to testing, the membrane is treated by applying pure water at about 5 psig for 10 minutes.

The IPA-wetted membrane is then installed in a test apparatus where a liquid mixture is supplied by a standard centrifugal pump through an entrance passage leading to an end surface of the module, allowing the mixture to travel through the feed passageway system which extends axially throughout the entire module. The pump is set to maintain a substantially constant pressure. The permeate which flows through the pores in the membrane is collected, examined and measured. A test is carried out using a mixture of about 5 weight percent vegetable oil and about 95 weight percent water. The mixing which results from passage through the pump causes the mixture to have a generally homogenous cloudy appearance. It is pumped to the test apparatus at a constant pressure of about 20 psig. Permeate is collected for two hours and then measured and examined. The permeate is clear water with a few microdroplets at the very bottom having a density greater than that of water. The membrane has an A-value of about 46.1.

The test is then repeated using a mixture of 40 weight percent vegetable oil and 60 weight percent water. The high shear forces of the pump cause it to have a relatively creamy appearance. The test is again run for two hours at 20 psig, and the appearance of the permeate remains exactly the same, i.e., clear water with some microdroplets of heavier material. The A-value is about 26.6; the lower value is expected when operating with an input solution of substantially lower water content.

EXAMPLE II

The tests set forth in Example I are repeated using a similar module which is made from 7.1 square feet of Gore-Tex PTFE membrane having a substantially uniform pore size of about 0.02 micron laminated upon a simlar polypropylene backing layer. The remaining test conditions are maintained the same for comparison purposes. In the test with the 5 weight percent vegetable oil and water mixture, the permeate is clear water with a small amount of droplets of oil which float on the water surface. The membrane has an A-value of about 59.6. The permeate from the test with the 40 weight percent vegetable oil mixture is the same as that from the 5 percent, with the membrane having an A-value of about 34.7.

EXAMPLE III

The membrane module of Example I is tested with a feed solution including water-soluble latex paint and some organic solvents as a part of a mixture with water, wherein the water constitutes about 95 weight percent of the mixture. The mixture is fed to the module at a about 56 psig, and the permeate is collected for about 3 hours. The permeate is clear water, and the membrane has an A-value of about 4.9.

The test is repeated using a mixture of about 2 weight percent cutting oil, which is totally miscible with water, and 98 percent water, again at about 56 psig for 3 hours. A clear permeate is obtained having no evidence of organic oil, and the membrane has an A-value of about 75. This is considered to be a very efficient separation of water from such a miscible oil-water mixture.

EXAMPLE IV

The two tests of Example III are repeated using the membrane of Example II having the uniform pore size of about 0.02 microns. Both produce a similar clear permeate. The membrane has an A-value of about 12 when operating with the water-soluble paint mixture and an A-value of about 43.7 when operating with the 2 percent water-soluble cutting oil mixture.

EXAMPLE V

The membrane module of Example I is tested with a mixture of about 5 percent olive oil and 95 weight percent water. Operation is carried out at a pressure of about 35 psig, and measurements are made for periods varying from 1 hour to 24 hours. In each instance, the permeate is clear water. The A-values vary from about 20 to about 54.

EXAMPLE VI

The membrane module of Example I is next tested by feeding a thick, pink, wastewater emulsion that is high in suspended solids and also contains organic oils, which is wastewater from a cosmetic manufacturing plant. A pressure of about 70 psig is employed, with a pressure drop of about 10 psi occurring from the inlet to the outlet of the test apparatus. The permeate is clear water, and an initial A-value of about 7.2 is obtained which begins to drop as dewatering of the constantly recirculated feed solution takes place. By back-flushing the system for about 15 seconds with water at about 7 psig, the suspended solid cake is lifted from the membrane surface, and the flux improves substantially following back-flushing. The membrane module is considered to provide an effective device for dewatering such waste liquid so that disposal costs can be substantially reduced.

EXAMPLE VII

The membrane module of Example I is next tested with a solution of plating wastewater containing both chromium hydroxide and copper hydroxide, primarily in the form of suspended solids. Application of such wastewater to the membrane at a pressure of about 10 psig at ambient temperature produces a clear water permeate and an A-value of about 383.

Repeating the test under the same conditions using the membrane module of Example II shows that the water permeate quality remains excellent and the A-value rises significantly to about 1974. By employing periodic flushing, such as back-flushing, as hereinbefore described, high A-values continue to be achieved. Alternatively, the modules can be adequately flushed by simply interrupting flow for about a minute each hour and pumping clear water at about 5 psig which effectively scours the inlet surface of the PTFE membrane and avoids the suspended solids from plugging.

The test is then repeated with a membrane module which is similar in all respects to that described in Example I except that a Gore-Tex membrane having a substantially uniform pore size of about 0.45 micron and a similar thickness of about 3 mils is utilized. Under similar test conditions, a clear permeate is also obtained, and an A-value of about 1622 is measured.

All three of the above membrane modules appear to be useful to achieve initial dewatering of such a plating waste stream containing suspended solids; the concentrated mixture which results may be fed to a filter press or the like for final cleanup.

EXAMPLE VIII

The membrane of Example II is tested with whole milk as a feed at a temperature of about 60° F. at about 40 psig. An A-value of about 74.5 is obtained, and the permeate contains only about 5 percent of the amount of the milk fat that is present in the feed material, contains no protein and contains an amount of dissolved lactose equal to about 98 percent of the level of lactose dissolved in the feed material. Thus, it appears that these membranes would be useful for concentrating aqueous mixtures containing proteins.

Although the invention has been described with regard to certain preferred embodiments which are believed to constitute the best mode presently known to the inventor, it should be understood that modifications might be made as would be obvious to one having ordinary skill in this art without deviating from the scope of the invention which is set forth in the appended claims. Instead of isopropyl alcohol, an equivalent organic material which wets the surface of the PTFE membrane and changes its inherent permeation characteristics to permit the passage of water may be employed. Particular features of the invention are emphasized in the claims which follow:

What is claimed is:

1. A method of dewatering a diesel fuel-water mixture, which method comprises wetting a porous membrane consisting essentially of a highly crystalline polytetrafluoroethylene polymer by submersion in a composition consisting of at least about 50 volume percent isopropyl alcohol with any remainder being water to wet said membrane with isopropyl alcohol, which membrane has an average pore size between about 0.01 micron and about 1.0 micron and a thickness between about 0.5 mil and about 4 mils, and contacting said wetted membrane with a mixture of diesel fuel having a viscosity between about 0.5 centipoise and 1000 centipoisos and water at a pressure not greater then about 90 psig. and a temperature between 0° C. and 100° C. so that water passes through said porous membrane to the substantial exclusion of diesel fuel to thereby deplete such mixture of its water content.

2. A method of dewatering an oil-water mixture, which method comprises wetting a porous membrane consisting essentially of a highly crystalline polytetrafluoroethylene polymer by submersion in a composition consisting of at least about 50 volume percent isopropyl alcohol with any remainder being water to wet said membrane with isopropyl alcohol, which membrane has an average pore size between about 0.01 micron and about 1.0 micron and a thickness between about 0.5 mil and about 4 mils, and contacting said wetted membrane with such oil-water mixture at a pressure between about 5 psig. and about 20 psig. so that water passes through said porous membrane to the substantial exclusion of oil to thereby deplete such mixture of its water content.

3. A method of dewatering an oil-water emulsion, which method comprises wetting a porous membrane consisting essentially of a highly crystalline polytetrafluoroethylene by submersion in a composition consisting of at least about 50 volume percent isopropyl alcohol with any remainder being water to wet said membrane with isopropyl alcohol, which membrane has an average pore size between about 0.02 micron and about 0.5 micron and a thickness between about 2 mils and about 3 mils, and contacting said wetted membrane with such oil-water emulsion at a pressure between about 5 psig. and about 20 psig. so that water passes through said porous membrane to the substantial exclusion of the oil to thereby deplete such emulsion of its water content.

* * * * *

UNITED STATES PATENT AND TRADEMARK OFFICE
CERTIFICATE OF CORRECTION

PATENT NO. : 4,780,211
DATED : October 25, 1988
INVENTOR(S) : Larry A. Lien

It is certified that error appears in the above-identified patent and that said Letters Patent is hereby corrected as shown below:

Column 1, line 44, Change "(PTEE)" to --(PTFE)--.

Column 2, line 8, Correct the spelling of --thereacross--.

Column 2, line 15, Correct the spelling of --substantially--.

Column 2, line 31, after "Gore," insert --the--.

Column 3, line 11, Correct the spelling of --Similarly--.

Column 4, line 66, Correct the spelling of --similar--.

Column 8, line 4, After "polytetrafluoroethylene", insert --polymer--.

Signed and Sealed this

Fourth Day of July, 1989

Attest:

DONALD J. QUIGG

*Attesting Officer*  *Commissioner of Patents and Trademarks*